Jan. 30, 1934.                H. C. DRAKE                1,944,930
                              FLAW DETECTOR
                           Filed Dec. 31, 1931         2 Sheets-Sheet 1
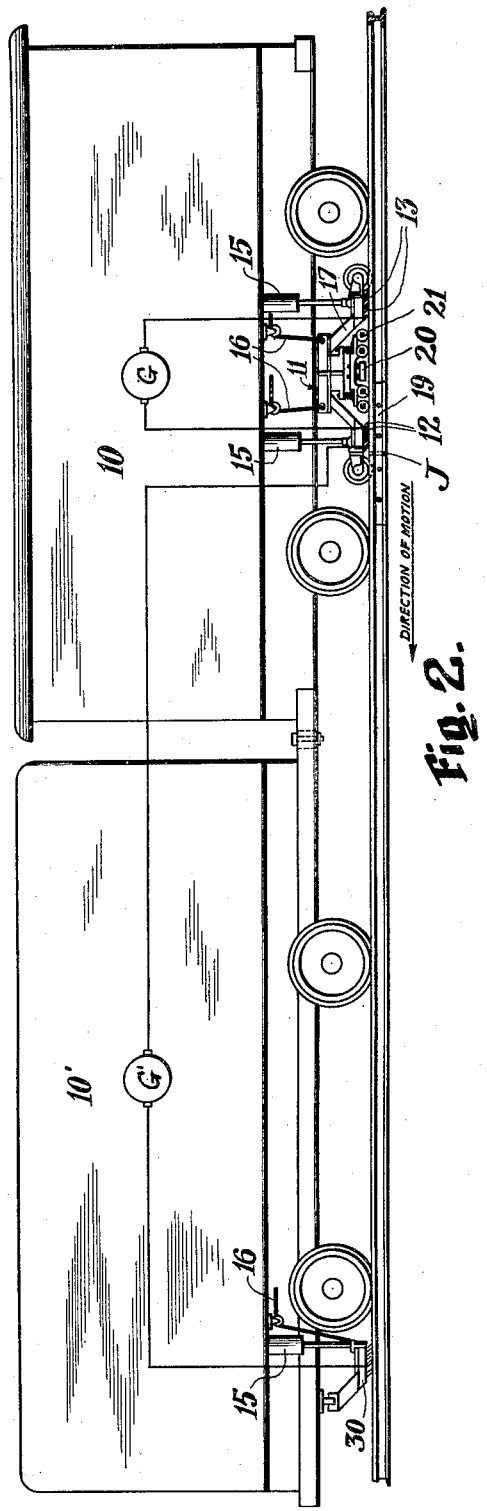
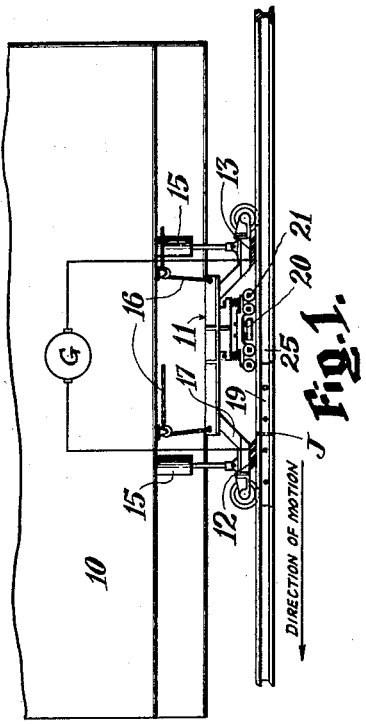
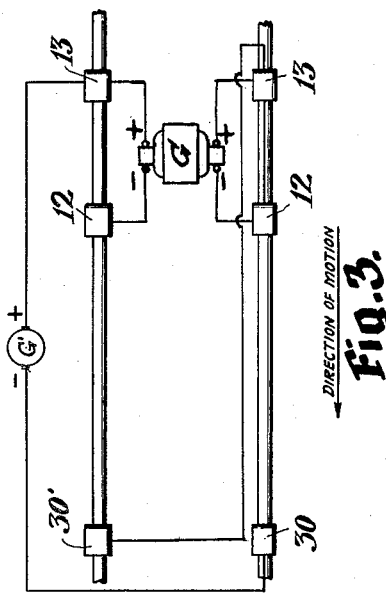
INVENTOR
Harcourt C. Drake
BY
Joseph H. Lipschutz
ATTORNEY Jan. 30, 1934.                H. C. DRAKE                1,944,930
                              FLAW DETECTOR
                         Filed Dec. 31, 1931        2 Sheets-Sheet 2
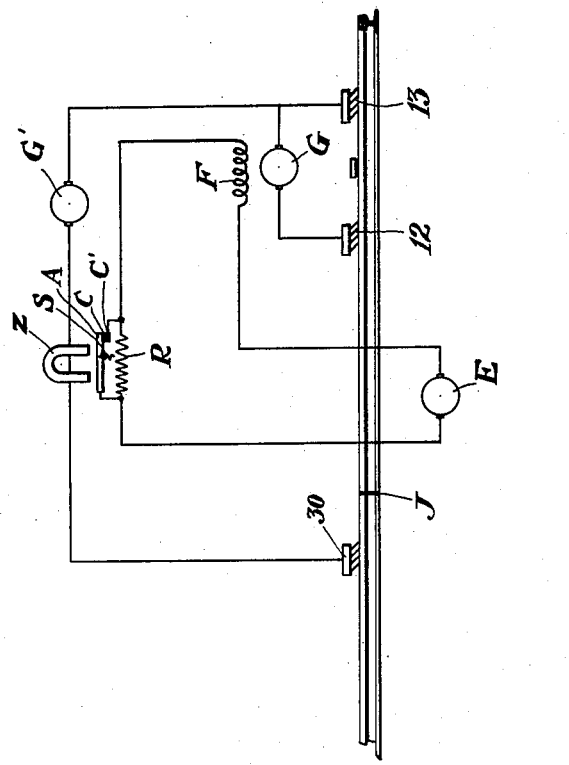
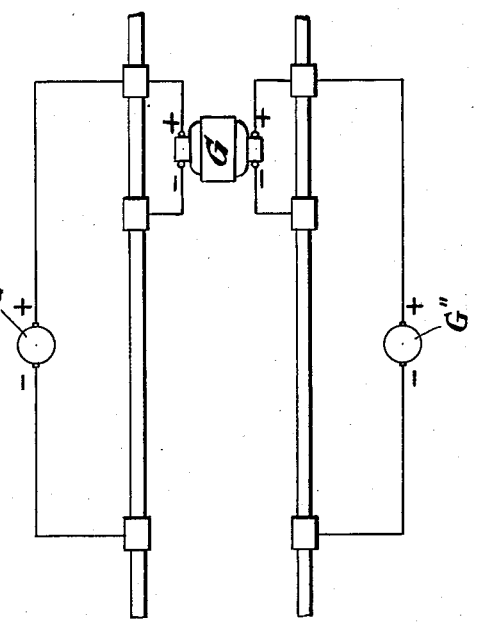
INVENTOR
Harcourt C. Drake
BY
Joseph H. Lipschutz
ATTORNEY Patented Jan. 30, 1934

1,944,930

UNITED STATES PATENT OFFICE 1,944,930

FLAW DETECTOR

Harcourt C. Drake, Hempstead, N. Y., assignor to Sperry Products, Inc., Brooklyn, N. Y., a corporation of New York Application December 31, 1931
Serial No. 584,098

15 Claims. (Cl. 175—183)

This invention relates to rail flaw detecting apparatus of the type disclosed in the patent to Elmer A. Sperry, No. 1,820,505, granted August 25, 1931. This application is a continuation in part of my application, Ser. No. 542,300 filed June 5, 1931. Such flaw detection apparatus comprises passing of a heavy current through an electrical conductor to be tested so as to establish an electro magnetic field surrounding the conductor and then moving a pair of opposed induction coils along said conductor. When a flaw occurs the axis of the current is displaced and the said induction coils on encountering said displaced electromagnetic field will generate a differential E. M. F. which is then amplified and the amplified voltage is caused to operate a recorder or other indicator.

The current is led into the conductor by contact brushes and leaves the conductor by a second set of brushes, both sets of brushes being carried by a carriage which supports the detector carriage between the two sets of brushes. It has been found that it takes some time after the current enters the conductor for the molecules to align themselves with the proper polarity relative to the polarity of the energizing current and therefore it was desirable to space the induction coils a considerable distance back of the brushes which led the current into the conductor. For reasons to be set forth more in detail hereinafter, this resulted in inability of the testing mechanism to test rails up to the joint-bars and it was found that flaws sometimes occured in the portions of the rail which thus remained untested.

It is the principal object of my invention, therefore, to provide an apparatus which will give all of the benefits resulting from allowing time for the molecules to align themselves with the proper polarity while permitting testing of rails up to the joint-bars.

A further object of my invention is the provision of means for performing the above function while at the same time increasing the amperage between the sets of brushes of the current-brush carriage.

Further objects and advantages of this invention will become apparent in the following detailed description thereof.

In the accompanying drawings,

Fig. 1 is a diagrammatic illustration of the detector mechanism as heretofore used, and which resulted in failure to test all of the rail up to the joint-bars.

Fig. 2 is a view similar to Figure 1, but showing my invention applied to a flaw detector device.

Fig. 3 is a wiring diagram of the Fig. 2 device.

Fig. 4 is a wiring diagram of a modified arrangement of my invention.

Fig. 5 is a wiring diagram illustrating a method for increasing current supply between the brushes when the auxiliary circuit fails.

Fig. 6 is a diagrammatic representation of the application of my invention to the magnetic type of testing device.

Referring to the drawings, I have shown a rail flaw detector which comprises a car body 10 from which is suspended a detector mechanism 11, comprising a carriage 17 having sets of brushes 12 and 13 for leading current into and out of the rail. The current may be supplied by a generator G mounted in the car body 10. The detector mechanism may be raised and lowered by means of the air cylinders 15 and cables 16. The current brush carriage 17 supports a detector carriage 21 carrying a pair of detector coils 20 therefrom.

As hereinbefore stated, it was found that in order to detect flaws efficiently it was desirable to allow time for the molecules of the rail head to align themselves with proper polarity with respect to the entering current before the detector coils 20 were passed thereover to detect flaws. For this reason, the detector carriage 21 and the coils 20 supported thereby, were mounted on the carriage 17 further removed from the front brushes 12 than the rear brushes 13.

One serious result of this construction is indicated by the positioning of the parts shown in Figure 1. It will be seen that coils 20 were positioned so far from brushes 12 that said brushes had passed the rail joint J and were on the next or succeeding rail while coils 20 and brushes 13 were still cooperating with the original rail. When the brushes 12 passed on to the succeeding rail the current then spread through the joint-bars 19 and back into the original rail. This caused a displacement of flux for a considerable distance back of the joint-bar and therefore it was necessary to set the joint cutout (not shown) so that the indicating mechanism was cut out before brushes 12 passed on to the succeeding rail. As a consequence, there was a portion of rail, indicated at 25, which remained untested, and it was found that flaws sometimes occurred in this portion of the rail.

If the coils 20 were moved close enough to brushes 12 so that said coils reached the joint-bar before brushes 12 passed on to the next rail, then it can be seen that there would be very little time during which the molecules of the rail, which normally have a heterogeneous polarity arrangement, could arrange themselves with their poles in agreement with the polarity of the current before coils 20 were passed thereover. It has been found that the maximum efficiency in testing is not attained until such agreement of polarity is obtained.

In order to obtain the benefits of an established electromagnetic field and at the same time permit coils 20 to test up to the joint-bars, I provide the mechanism disclosed in Figures 2 and 3. In this mechanism I have shown the coils 20 mounted close enough to brushes 12 so that said coils have reached the joint-bar before brushes 12 have passed into engagement with the succeeding rail. In addition, however, I have provided an auxiliary circuit including another set of brushes 30 in advance of brushes 12 so that the rail may be pre-energized with current in advance of the carriage 17. Said auxiliary brushes 30 may be raised and lowered by air cylinder 15 and cable 16 in the same manner as brushes 12 and 13, and may be suitably supported from the car body 10, if the flaw detector is a single unit car, or from the car body 10' if a two-unit flaw detector is employed. A separate generator G' may be employed to send current into the rail by way of brushes 30. The current may pass through the rail and out by way of brushes 13 so that the amperage of generator G' is thus added to the amperage of generator G between brushes 12 and 13. I may connect the two rails in series for the purpose of establishing this auxiliary circuit and the current after leaving one set of brushes 13 may then enter the other rail through auxiliary brushes 30' and out by way of the other set of brushes 13. Thus the amperage of generator G is established through both rails for the pre-energization and is a more economical way of doing this than by providing a separate generator or a separate generator winding for each rail. In the case of the portions of the rails between brushes 12 and 13 I have shown a generator G provided with two windings, one for each rail, because it is sometimes desired to test only one rail.

With the form of the invention disclosed in Figs. 2 and 3 it will be seen that it is necessary to insulate the wheels of the car at the two sides from each other, otherwise the auxiliary circuit would be shorted. Similarly, if an insulated joint were encountered on one track it would cut out the auxiliary circuit in both tracks. To obviate these conditions, I may provide the generator G' with two independent windings G'', one for each side of the track, so that each auxiliary circuit is independent of the other. This is similar to the two windings on the main generator G. Therefore it is not necessary to insulate the wheels of the car from each other and encountering an insulated joint on one track will not break the auxiliary circuit in both tracks.

When an insulated or high resistance joint is encountered by the leading or auxiliary brush 30, the auxiliary circuit is broken and hence the circuit between the main brushes 12 and 13 is reduced in amperage by the amount of said auxiliary circuit. To counteract this effect, I may cause the output of generator G to be stepped up at such times by means such as the following—The field F of the main generator is energized by an exciter E and in the circuit of said exciter there may be interposed a resistance R. When the brush 30 passes beyond the insulated or high resistance joint to break the auxiliary circuit I may cause a zero current relay Z to be deenergized because said relay is in the said auxiliary circuit and such deenergization will permit springs S to pull down armature A and close contacts C, C' to establish a short circuit around resistance R. This strengthens the field F and causes the generator to deliver greater amperage to the portion of the rail between brushes 12 and 13, and thus counteract the effect of breaking the auxiliary circuit.

As a result of such pre-energization of the rail where current passes through the rail in advance of the current between brushes 12 and 13, and in the same direction, the molecules are evidently placed in such a condition that the circuit between brushes 12 and 13 is far more effective and the electromagnetic field much more sensitive than otherwise, thus resulting in detector coils 20 picking up flaws which they might otherwise have missed.

By referring to Fig. 6 it will be seen that the principles hereinbefore outlined in connection with my invention are applicable to the magnetic type of device as well as the electric current type. Normally, such magnetization is accomplished by means of an electromagnet 50 which is provided with a U-shaped core 51 whose arms extend downwardly into close proximity with the conductor so that the flux introduced into the conductor forms a magnetic circuit with said U-shaped core. For the purpose of applying my invention to this type of testing, I may provide an extension 55 of said core in the shape of an elongated U upon which there is mounted an auxiliary electromagnet 52 for introducing flux in the conductor in advance of the detector unit. This unit includes a small U-shaped core 53 placed between the arms of the large core 51 and having a winding 54 thereon to pick up any variations in the magnetic circuit.

The hereinbefore described method of testing is applicable not only to testing by non-contacting coils to detect variations in the position of the current axis of flux due to flaws, but also to the contact type of testing, as disclosed in the patent to E. A. Sperry, No. 1,804,380 granted May 5, 1931, to detect variations in the quantity of flux.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. The method of detecting flaws in electrical conductors, consisting in energizing with flux in a given direction a portion of said conductor to be tested, detecting variations in said flux and pre-energizing a portion of said conductor in advance of said first portion in the same direction.

2. In a flaw detector for electrical conductors, means for energizing a portion of said conductor with flux in a given direction, detector means co-operating with said portion for detecting variations in flux means for pre-energizing a portion of said conductor in advance of said first portion, and in the same direction.

3. In a flaw detector for rails in track, said rails being joined by joint-bars, means for leading current into and out of the rail, means for pre-energizing a portion of the rail in advance of said first means and in the same direction as said first means, and a detector unit so positioned with respect to said first means that said first means will be entirely in engagement with the succeeding rail before said unit has passed beyond the joint-bar.

4. In a flaw detector for rails in track, said rails being joined by joint-bars, means for leading current into and out of the rail, a detector unit so positioned with respect to said first means that said unit will have reached a joint-bar before said first means engages the succeeding rail, and means for sending an auxiliary current through said rails in advance of said first means and in the same direction.

5. In a rail flaw detector, means for establishing an electric current through the rail, including a source of current and brushes for leading the current into and out of the rail, a detector unit positioned between said brushes, and means for establishing an auxiliary circuit through the rail in advance of and in the same direction as said first circuit.

6. In a rail flaw detector, means for establishing an electric current through the rail, including a source of current and brushes for leading the current into and out of the rail, a detector unit positioned between said brushes, and means for establishing an auxiliary circuit through the rail in advance of and in the same direction as said first circuit, said auxiliary circuit including the portion of said rail in said first circuit.

7. In a rail flaw detector, means for establishing an electric current through the rail, including a source of current and brushes for leading the current into and out of the rail, a detector unit positioned between said brushes, and means for establishing an auxiliary circuit through the rail in advance of said first circuit and in the same direction, said auxiliary circuit including a source of current, said last named source of current and the two rails of a track being connected in series.

8. In a rail flaw detector, means for establishing an electric current through the rail, including a source of current and brushes for leading the current into and out of the rail, a detector unit positioned between said brushes, and means for establishing an auxiliary circuit through the rail in advance of said first circuit and in the same direction, said auxiliary circuit including an additional brush engaging the rail in advance of said first named brushes.

9. In a rail flaw detector, means for establishing an electric current through the rail, including a source of current and brushes for leading the current into and out of the rail, a detector unit positioned between said brushes, and means for establishing an auxiliary circuit through the rail in advance of said first circuit and in the same direction, said auxiliary circuit including a source of current and additional brushes engaging the two rails of a track, said last named source of current and the rails of the track being connected in series.

10. In a rail flaw detector, means for sending electric current through a pair of rails of a track, including a generator and brushes for leading current into and out of the tracks, a detector unit positioned between said brushes, and means for establishing an auxiliary circuit through each rail in the same direction as said first means, including an auxiliary generator having two windings, one for each track.

11. In a rail flow detector, means for sending electric current through a pair of rails of a track, including a generator having two windings, one for each track, and brushes for leading current into and out of the tracks, a detector unit positioned between said brushes, and means for establishing an auxiliary circuit through each rail in the same direction as said first means, including an auxiliary generator having two windings, one for each track.

12. In a rail flaw detector, means for sending electric current through a pair of rails of a track, including a generator having two windings, one for each track, and brushes for leading current into and out of the tracks, a detector unit positioned between said brushes, and means for establishing an auxiliary circuit through each rail in the same direction as said first means, including an auxiliary generator having two windings, one for each track, each of said auxiliary circuits including the portion of the respective rail in said first circuit.

13. In a rail flaw detector, means for establishing an electric current through the rail, including a source of current and brushes for leading the current into and out of the rail, a detector unit positioned between said brushes, means for establishing an auxiliary circuit through the rail in advance of and in the same direction as said first circuit, said auxiliary circuit including the portion of said rail in said first circuit, and means whereby the current delivered by said source is increased when the auxiliary circuit is broken.

14. In a rail flaw detector, means for establishing an electric current through the rail, including a source of current and brushes for leading the current into and out of the rail, a detector unit positioned between brushes, means for establishing an auxiliary circuit through the rail in advance of and in the same direction as said first circuit, said auxiliary circuit including the portion of said rail in said first circuit, and means whereby the current delivered by said source is increased when the auxiliary circuit is broken, said last named means including a resistance in the circuit of said source, a relay in said auxiliary circuit responsive to failure of the current in said circuit, and means whereby said relay short-circuits said resistance upon failure of the current in the auxiliary circuit.

15. In a rail flaw detector, means for establishing an electric current through the rail, including a source of current and brushes for leading the current into and out of the rail, a detector unit positioned between said brushes, means for establishing an auxiliary circuit through the rail in advance of and in the same direction as said first circuit, said auxiliary circuit including the portion of said rail in said first circuit, and means in the circuit of said source of current adapted to be rendered effective when the auxiliary circuit is broken for increasing the current delivered by said source.

HARCOURT C. DRAKE.

CERTIFICATE OF CORRECTION.

Patent No. 1,944,930.   January 30, 1934.

HARCOURT C. DRAKE.

It is hereby certified that error appears in the printed specification of the above numbered patent requiring correction as follows: Page 3, first column, line 3, claim 2, after "flux" insert the word and; and that the said Letters Patent should be read with this correction therein that the same may conform to the record of the case in the Patent Office.

Signed and sealed this 15th day of March, A. D. 1938.

(Seal)

Henry Van Arsdale,
Acting Commissioner of Patents.